Patented Nov. 28, 1950

2,531,408

UNITED STATES PATENT OFFICE 2,531,408

INTERPOLYMERS OF ACRYLONITRILE AND ITACONIC ACID

Gaetano F. D'Alelio, Shaker Heights, Ohio, assignor to Industrial Rayon Corporation, Cleveland, Ohio, a corporation of Delaware No Drawing. Application December 13, 1946, Serial No. 716,168

7 Claims. (Cl. 260—78.5)

This invention relates to copolymers of acrylonitrile and itaconic acid. More particularly this invention is concerned with the polymerization product of a polymerizable mass comprising acrylonitrile and itaconic acid in the presence or absence of other monoethylenic copolymerizable compounds, which polymerization products are particularly adapted to dyeing. This invention also deals with compositions of these copolymers adapted to the formation of shaped articles and with processes for the conversion of these compositions to molecularly oriented fibers, threads, bristles, monofilaments, etc., hereinafter referred to as fibers, and other shaped articles such as films and the like, which articles show improved dyeing properties.

Generally, it has been known for some time that certain copolymers of acrylonitrile may be adapted to the preparation of shaped articles, such as films, fibers, foils, tubes, etc. Some of these copolymers have been regarded as capable of being cold drawn to produce structures molecularly oriented along the fiber axis. Cold drawing may be defined as the stretching of a polymeric material at a temperature below the melting point of the material to give a molecularly oriented structure.

In general, copolymers of acrylonitrile having high percentages of acrylonitrile in the polymer molecules, e. g. about 85 percent of more, have been regarded as desirable for the preparation of molecularly oriented structures. For some time the use of these copolymers was limited by the lack of information on suitable solvents. Recently however, more appropriate solvents, such as N,N-dimethyl acetamide, have been suggested for use in preparing compositions of copolymers containing at least about 85 percent acrylonitrile in the polymer molecule. The use of these effective solvents has made possible the preparation of molecularly oriented structures from acrylonitrile polymers.

A problem has now arisen regarding the dyeing properties of polymers containing high percentages of acrylonitrile with or without other nitrile derivatives. It appears that these polymers generally do not show favorable dyeing characteristics, especially toward basic dyes.

It has now been found that acrylonitrile-itaconic acid copolymer compositions may be prepared, which compositions are particularly adapted to dyeing and to the formation of molecularly oriented shaped articles. Such articles may be produced in accordance with this invention by dissolving the copolymer in a suitable solvent, coagulating the desired polymer into the shaped article and thereafter subjecting the article to such further treatment, e. g., cold drawing, heat treating, dyeing, etc., as may be necessary to give the article the desired properties.

The amount of itaconic acid desirable in the polymer molecules varies with the amount of other components and the particular properties desired in the products. Generally, about 5 percent or less itaconic acid is sufficient to give improved dyeing properties, even amounts of about 1 percent usually being effective. However, more than 5 percent itaconic acid may be used but no particular additional dyeing advantage accrues.

This invention will be more fully described by the following examples, although it is understood that the invention is not intended to be limited by these examples. These examples illustrate the use of itaconic acid to enhance the dyeing properties of acrylonitrile polymers. In these examples "parts" of materials is intended to mean parts by weight.

Example I

A copolymer was prepared from a mixture of 95 parts acrylonitrile and 5 parts itaconic acid under the following conditions: 100 parts of mixed monomers was slowly added over a period of less than an hour to 750–1000 parts of distilled water at 30–50° C. containing dissolved therein 0.6 and 1 parts of ammonium persulfate and 0.6 to 1.5 parts of sodium bisulfide. The reaction was continued for 1–3 hours, at which time a yield of about 90 percent solid copolymer was precipitated. The resulting copolymer had an acid number of 15 and a molecular weight over 10,000.

Acrylonitrile was polymerized by itself under identical conditions described for the above copolymer. N,N-dimethyl acetamide solutions of the polyacrylonitrile and the acrylonitrile-itaconic acid copolymer were made and a film of each cast therefrom.

A solution of methylene blue dye (a basic dye) was prepared by making a paste of the dye with 1 percent by weight acetic acid and then dissolving in sufficient water to make a 1 percent by weight dye solution. This dye solution was heated to boiling and the two aforementioned films immersed therein for one hour. The dyed films were then removed and separately subjected to washing with boiling water for one hour, the boiling water being changed frequently to remove the desorbed dye. The unmodified polyacrylonitrile film showed only a light tint, whereas the itaconic acid copolymer was dyed a deep and dense shade. Identical films were cold drawn and heat treated and showed dyeing characteristics similar to the undrawn films.

*Example II*

Fibers were spun from these same N,N-dimethyl acetamide solutions into glycerine baths, the fibers substantially freed from solvent and dried. The dried fibers were cold drawn 600–800 percent at 130–145° C. and then heat treated at 150° C. for one hour. These fibers were subsequently given the same dyeing and washing treatment described in Example I. After dyeing, the unmodified polyacrylonitrile fibers showed only a light tint, whereas the itaconic acid copolymer fibers had acquired a deep and dense color.

The copolymers of this invention show greatly affinity toward many dyes, especially basic dyes. Basic dyes containing amino groups, both substituted and unsubstituted, are particularly effective. It appears that the acid groups of the copolymers may become attached to the amino groups of the dye molecules by chemical reaction or salt formation, thereby giving fast and more lasting properties to the dyed products.

The practice of this invention is not limited to the modification of polyacrylonitrile, but may also be used to improve the dyeing characteristics of various acrylonitrile copolymers containing vinyl, vinylidene or other monoethylenic copolymerizable compounds, typical examples of which are vinyl chloride, vinylidene chloride, methacrylonitrile, etc. As further illustration, itaconic acid may be incorporated in copolymer molecules of the type disclosed in co-pending patent applications, Serial Nos. 716,166, 716,167, 716,169, and 716,170, filed on the same date herewith. Serial Nos. 716,166 and 716,167 are now abandoned. The copolymers disclosed therein include copolymers of acrylonitrile with at least about 1 percent fumaronitrile, methyl beta-cyanoacrylate, beta-cyanoacrylamide or itaconamide. The presence of itaconic acid in the polymer molecules of such copolymers imparts similar improvements in dyeing characteristics as are evident in the copolymers of the above examples.

As indicated in these copending applications, the copolymers disclosed therein are especially useful in the preparation of molecularly oriented shaped articles, such as fibers, films, etc. For such purposes the percentage of acrylonitrile, fumaronitrile, methyl beta-cyanoacrylate, beta-cyanoacrylamide, itaconamide and other copolymerizable compounds are advantageously kept within certain limits, these limits depending somewhat on the bonding strengths of the groups present in the compound or compounds copolymerized with acrylonitrile. The use of copolymerizable compounds having groups of high bonding strength usually permits lower percentages of acrylonitrile without sacrificing too greatly the ability of the products to form molecularly oriented structures. Vice versa, the use of copolymerizable compounds having groups of low bonding strength generally sets a higher limit on the minimum amount of acrylonitrile which may be combined in the polymer molecule in order that the copolymers retain their molecular orientation properties.

As disclosed in the aforementioned applications, the minimum percentage of acrylonitrile in the polymer molecules may advantageously be set as follows: for fumaronitrile copolymers, about 40; for beta-cyanoacrylamide, about 36; for methyl beta-cyanoacrylate, about 60; and for itaconamide, about 75. Generally, the effectiveness of fumaronitrile, beta-cyanoacrylamide, methyl beta-cyanoacrylate and itaconamide in acrylonitrile copolymer molecules is evident when they are present in amounts of about 1 percent by weight or more.

The amounts of other copolymerizable compounds present in the polymer molecule may also be advantageously within the following percent ranges: for fumaronitrile and beta-cyanoacrylamide, from $$0 \text{ to } \frac{115 - X - 2Y}{2}$$

and for methyl beta-cyanoacrylate and itaconamide, from $$0 \text{ to } 15 - Y$$

wherein X is the percent of acrylonitrile and Y is the percent of itaconic acid present in the polymer molecule, the sum of the copolymerizable compounds equaling 100 percent.

Examples of a number of suitable tripolymers containing acrylonitrile, itaconic acid and a third monomer are given below in percents by weight.

| Acrylonitrile | Itaconic acid | Third Monomer |
|---|---|---|
| 90 | 5 | 5 Methacrylonitrile |
| 95 | 2 | 3 Fumaronitrile |
| 90 | 5 | 5 Fumaronitrile |
| 90 | 2 | 18 Vinyl chloride |
| 85 | 5 | 10 Vinylidene chloride |
| 90 | 5 | 5 Vinylidene chloride |
| 90 | 5 | 5 Methyl beta-cyanoacrylate |
| 65 | 5 | 30 Beta-Cyanoacrylamide |
| 80 | 5 | 15 Itaconamide |
| 95 | 2 | 3 Vinyl chloracetate |
| 90 | 5 | 5 Styrene |
| 85 | 5 | 10 Monochlorostyrene |
| 80 | 5 | 15 Dichlorostyrene |

The copolymers of this invention may be prepared by any suitable method, for example, by mass polymerization, emulsion polymerization, etc. It may be advantageous to add various ingredients to the polymerizable mass such as catalysts, emulsifying agents, solvents, etc. Various materials may also be incorporated in the copolymers. For example, plasticizers, lubricants, pigments, etc. may be added either to the polymerizable mass or the copolymers to give special properties to the resultant product.

Acrylonitrile and itaconic acid have the following formulas respectively

and

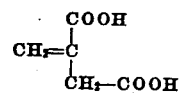

Acrylonitrile polymers, therefore, have repeating units of the following formula

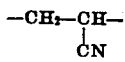

and itaconic acid poylmers or copolymers have repeating units of the formula

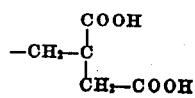

The acrylonitrile-itaconic acid copolymers of this invention have polymer molecules containing repeating units of both of the above types. Tripolymers and other copoylmers of acrylonitrile and itaconic acid which contain additional copolymerizable compounds in the polymer molecule will have other repeating units together with both of the above types. These other units will correspond to those derived from polymerization or copolymerization of the third copolymerizable compounds or mixtures of compounds, such as from fumaronitrile, methyl beta-cyanoacrylate, beta-cyanoacrylamide, itaconamide, methyacrylonitrile, vinyl chloride, vinylidene chloride, vinyl chloroacetate, styrene, monochlorostyrene, dichlorostyrene, etc.

For use in the preparation of shaped articles, the copolymers of this invention have molecular weights preferably of at least about 10,000. However, copolymers of molecular weights less than 10,000 may be used for other purposes, such as impregnants, solvent resistant coatings, etc. The molecular weight of the copolymers is dependent on the concentrations of monomers, the amount and type of catalyst, the temperature of reaction, etc.

As is quite generally known in the field of high polymers, molecular orientation is usually indicated and identified by birefringence of polarized light, as under Nicol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation or crystallization. Amorphous or non-crystalline materials give X-ray diagrams having very few high lights or bright spots whereas crystalline or oriented materials give definite X-ray diffraction patterns. In these patterns there are definite relationships of the bright spots with regard to position and spacing which are generally characteristic of the composition of the material being X-rayed. In fibers or films the orientation usually follows the direction of drawing or stretching so that the orientation is parallel to the fiber axis or a major surface.

The acrylonitrile copolymers discussed herein are generally insoluble in the common organic solvents, such as acetone, ethyl acetate, methyl alcohol, butyl acetate, cyclohexanone, dioxane, nitromethane, etc. These copolymers are soluble, however, in N,N-dimethyl acetamide, N,N-dimethyl formamide and a number of similar solvents, used alone or in conjunction with N,N-dimethyl cyanamide; N, N-dimethyl cyanoacetamide; N,N-dimethyl methoxyacetamide; methylene dinitrile; methylene dithiocyanate; formyl caprolactam,

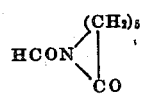

formyl morpholine,

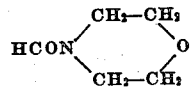

tetramethylene sulfone, etc.

Useful fibers may be made from the solutions of the copolymers of this invention by dry spinning, as in the preparation of cellulose acetate fibers, or by wet spinning, as in the preparation of viscose rayon. In wet spinning, the solution of copolymer may be spun into a substance which is a non-solvent for the copolymers, but which is advantageously compatible with the solvent in which the polymer is dissolved. For example, water, acetone, methyl alcohol, carbon disulfide, glycerine, chloroform, carbon tetrachloride, benzene, etc., may be used as a precipitating bath for N,N-dimethyl acetamide and other solvent compositions of these copolymers. The extruded fibers, from which substantially all of the solvent has been removed in the spinning step, about 1–10 percent remaining in the shaped article, may then be cold drawn about 100–600 percent, preferably about 300–600 percent; and the drawn fiber heat treated, usually at substantially constant length, at about 150–160° C. to effect further crystallization and removal of the remaining solvent. The term "heat treated," as used herein, refers to the application of heat to an object, usually at a controlled temperature and usually by means of the medium surrounding the object.

As discussed before, the molecularly oriented fibers and other structures of this invention may be identified by their X-ray diffraction patterns which are distinct and characteristic. These structures may also be characterized generally by their low shrinkage in boiling water, which shrinkage is generally about 3 to 5 percent or less of the cold drawn or stretched article.

The fibers prepared by the practice of this invention are especially advantageous because of their improved dyeing properties, resistance to shrinkage, good heat resistance and tensile strength. Moreover, these properties make the fibers desirable for use in the manufacture of hosiery and for such all-purpose fabrics as used for blouses, shirts, suits, etc.

I claim:

1. A composition of matter comprising a copolymer of acrylonitrile and itaconic acid, said copolymer containing in the polymer molecule at least about 36 percent by weight acrylonitrile and at least about 1 percent but no more than about 5 percent by weight itaconic acid.

2. A fiber comprising a copolymer of acrylonitrile, itaconic acid and a member of the class consisting of fumaronitrile, beta-cyanoacrylamide, methyl beta-cyanoacrylate and itaconamide, said copolymer having a molecular weight of at least about 10,000 and containing in the polymer molecule at least about 36 percent by weight acrylonitrile and at least about 1 percent but no more than about 5 percent by weight itaconic acid.

3. A cold drawn fiber having molecular orientation, said fiber comprising a copolymer of acrylonitrile and itaconic acid, and said copolymer having a molecular weight of at least about 10,000 and containing in the polymer molecule at least about 36 percent by weight acrylonitrile and at least about 1 percent but no more than about 5 percent by weight itaconic acid.

4. A cold drawn fiber having molecular orientation, said fiber comprising a copolymer of acrylonitrile and itaconic acid, and said copolymer having a molecular weight of at least about 10,000 and containing in the polymer molecule at least about 85 percent by weight acrylonitrile and at least about 1 percent but no more than about 5 percent by weight itaconic acid.

5. A cold drawn fiber having molecular orientation, said fiber comprising the reaction product of a basic dye and a copolymer of acrylonitrile and itaconic acid, and said copolymer having a molecular weight of at least about 10,000 and containing in the polymer molecule at least about 36 percent by weight acrylonitrile and at least about 1 percent but no more than about 5 percent by weight itaconic acid.

6. A cold drawn fiber having molecular orientation, said fiber comprising the reaction product of an acrylonitrile-itaconic acid copolymer and a dye containing amino groups, and said copolymer having a molecular weight of at least about 10,000 and containing in the polymer molecule at least about 36 percent by weight acrylonitrile and at least about 1 percent but no more than about 5 percent by weight itaconic acid.

7. A cold drawn fiber having molecular orientation, said fiber comprising a copolymer of acrylonitrile, itaconic acid, and a member of the class consisting of fumaronitrile, beta-cyanoacrylamide, methyl beta-cyanoacrylate and itaconamide, said copolymer having a molecular weight of at least about 10,000 and containing in the polymer molecule at least about 1 percent but no more than about 5 percent by weight itaconic acid, and the percent of the member of the class present in the polymer molecule ranging, for fumaronitrile and beta-cyanoacrylamide copolymers $$\text{up to } \frac{115-X-2Y}{2}$$

and, for methyl beta-cyanoacrylate and itaconamide copolymers, $$\text{up to } 15-Y$$

wherein $X$ is the percent by weight of acrylonitrile and $Y$ is the percent of itaconic acid in the polymer molecule: in which polymer molecules, when fumaronitrile is present, there must be at least about 40 percent acrylonitrile; when beta-cyanoacrylamide is present, there must be at least about 35.5 percent acrylonitrile; when methyl beta-cyanoacrylate is present, there must be at least about 65 percent acrylonitrile; when itaconamide is present, there must be at least about 75 percent acrylonitrile; and the sum of the copolymerized components equals 100 percent.

GAETANO F. D'ALELIO.

REFERENCES CITED

The following references are of record in the file of this patent:

UNITED STATES PATENTS

| Number | Name | Date |
|---|---|---|
| 2,366,495 | D'Alelio | Jan. 2, 1945 |
| 2,375,256 | Soday | May 8, 1945 |
| 2,404,713 | Houtz | July 23, 1946 |